US00RE46455E

(19) United States
(12) Reissued Patent
Ise et al.

(10) Patent Number: US RE46,455 E
(45) Date of Reissued Patent: *Jun. 27, 2017

(54) IMAGE PICKUP LENS FOR SOLID-STATE IMAGE PICKUP ELEMENT

(71) Applicant: KANTATSU CO., LTD., Yaita-shi, Tochigi (JP)

(72) Inventors: Yoshio Ise, Sukagawa (JP); Masaya Hashimoto, Sukagawa (JP)

(73) Assignee: KANTATSU CO., LTD., Yaita (JP)

( * ) Notice: This patent is subject to a terminal disclaimer.

(21) Appl. No.: 14/993,854

(22) Filed: Jan. 12, 2016

Related U.S. Patent Documents

Reissue of:
(64) Patent No.: 8,422,145
Issued: Apr. 16, 2013
Appl. No.: 13/203,159
PCT Filed: Mar. 24, 2010
PCT No.: PCT/JP2010/055048
§ 371 (c)(1),
(2) Date: Aug. 24, 2011
PCT Pub. No.: WO2010/113717
PCT Pub. Date: Oct. 7, 2010

U.S. Applications:
(63) Continuation of application No. 14/684,878, filed on Apr. 13, 2015, now Pat. No. Re. 45,941, which is an application for the reissue of Pat. No. 8,422,145.

(30) Foreign Application Priority Data

Mar. 31, 2009 (JP) ..... 2009-084695

(51) Int. Cl.
*G02B 13/18* (2006.01)
*G02B 9/60* (2006.01)
*G02B 13/00* (2006.01)

(52) U.S. Cl.
CPC ..... *G02B 13/18* (2013.01); *G02B 13/0045* (2013.01)

(58) Field of Classification Search
CPC ..... G02B 13/18; G02B 13/0045
(Continued)

(56) References Cited

U.S. PATENT DOCUMENTS 5,267,086 A 11/1993 Hirano
7,075,736 B1 7/2006 Lundgren
(Continued)

FOREIGN PATENT DOCUMENTS

JP 3-138612 A 6/1991
JP 2007-264180 A 10/2007
JP 2007-298572 A 11/2007

OTHER PUBLICATIONS

"F-Number." 2003. In the Macmillan Encyclopedia. Basingstoke, United Kingdom: Macmillan Publishers, Ltd.
(Continued)

*Primary Examiner* — Christina Y Leung
(74) *Attorney, Agent, or Firm* — Oliff PLC

(57) ABSTRACT

Disclosed is a low-cost, compact image pickup lens for a solid-state image pickup element. The image pickup lens includes, in the order from an object side, a first lens L1, which has a convex surface facing the object side on an optical axis and has a positive refractive power; a second lens L2, which has a concave surface facing an image side on the optical axis and has a negative refractive power; a third lens L3, which has a convex surface facing the object side on the optical axis and has a meniscus shape; a fourth lens L4, which has a convex surface facing the image side on the optical axis, has a positive refractive power, and has a meniscus shape; and a fifth lens L5, which has a concave surface facing the image side on the optical axis, has a negative refractive power, and has a meniscus shape.

19 Claims, 12 Drawing Sheets

(58) Field of Classification Search
USPC ..... 359/763, 764
See application file for complete search history.

(56) References Cited

U.S. PATENT DOCUMENTS

| | | | | |
|---|---|---|---|---|
| 7,443,610 | B1 * | 10/2008 | Lin | G02B 9/60 359/714 |
| 8,179,615 | B1 * | 5/2012 | Tang et al. | 359/714 |
| 8,233,224 | B2 * | 7/2012 | Chen | 359/764 |
| 8,514,502 | B2 | 8/2013 | Chen | |
| 8,520,324 | B2 | 8/2013 | Chen | |
| 8,670,190 | B2 | 3/2014 | Chen | |
| 8,670,191 | B2 | 3/2014 | Chen | |
| 8,693,111 | B2 | 4/2014 | Chen | |
| 8,736,981 | B2 | 5/2014 | Chen | |
| 2001/0050758 | A1 | 12/2001 | Suzuki et al. | |
| 2004/0150893 | A1 | 8/2004 | Shinohara | |
| 2007/0229984 | A1 | 10/2007 | Shinohara | |
| 2007/0236811 | A1 * | 10/2007 | Mori | G02B 9/34 359/770 |
| 2009/0122423 | A1 | 5/2009 | Park et al. | |
| 2010/0253829 | A1 | 10/2010 | Shinohara | |
| 2011/0134305 | A1 | 6/2011 | Sano et al. | |
| 2011/0249348 | A1 * | 10/2011 | Kubota et al. | 359/764 |
| 2014/0146215 | A1 | 5/2014 | Chen | |
| 2015/0022700 | A1 | 1/2015 | Chen | |
| 2015/0022701 | A1 | 1/2015 | Chen | |

OTHER PUBLICATIONS

Hobbs, P.C.D. Chapter 4: Lenses, Prisms, and Mirrors, in Building Electro-Optical Systems: Making it all Work, Second Edition, John Wiley & Sons, Inc., Hoboken, NJ, USA, 2009, pp. 145-179.

International Search Report of PCT/JP2010/055048, mailing date Jun. 15, 2010.

* cited by examiner

IMAGE PICKUP LENS FOR SOLID-STATE IMAGE PICKUP ELEMENT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a reissue continuation of application Ser. No. 14/684,878, which is an application for reissue of U.S. Pat. No. 8,422,145; more than one reissue of U.S. Pat. No. 8,422,145 has been filed, including application Ser. No. 14/993,878, filed Jan. 12, 2016, which is a reissue continuation of application Ser. No. 14/684,878.*

TECHNICAL FIELD

The present invention relates to an image pickup lens for a solid-state image pickup element that is used in a small-size image pickup device for mobile terminals, PDA (Personal Digital Assistance) devices, and other small-size, thin electronic devices.

BACKGROUND ART

In recent years, the market for mobile terminals having an image pickup device has grown. Consequently, the image pickup device has begun to incorporate a small-size, high-pixel-number, solid-state image pickup element.

As an increasing number of small-size, high-pixel-number, image pickup elements are used, it is demanded that image pickup lenses be improved in terms of resolution and image quality. It is also demanded that such high-resolution, high-quality image pickup lenses become widespread and available at low cost.

An image pickup lens having plural lenses is made commonly available to meet the demand for high performance. An image pickup lens having five lenses, which exhibit higher performance than a lens having two to four lenses, is also proposed.

An image pickup lens disclosed, for instance, in Patent Document 1 exhibits high performance by including, in the order from an object side, a first lens, a second lens, a third lens, a fourth lens, and a fifth lens. The first lens has a convex surface on the object side and has a positive refractive power. The second lens has a concave surface facing an image side, has a negative refractive power, and has a meniscus shape. The third lens has a convex surface facing the image side, has a positive refractive power, and has a meniscus shape. The fourth lens has an aspherical surface on both sides, has a concave surface on the image side on an optical axis, and has a negative refractive power. The fifth lens has an aspherical surface on both sides and has a positive or negative refractive power.

An image pickup lens disclosed, for instance, in Patent Document 2 exhibits high performance by including, in the order from an object side, a first lens, a second lens, a third lens, a fourth lens, and a fifth lens. The first lens has an aperture stop and has a positive refractive power. The second lens is joined to the first lens and has a negative refractive power. The third lens has a concave surface facing the object side and has a meniscus shape. The fourth lens has a concave surface facing the object side and has a meniscus shape. The fifth lens has at least one aspherical surface, has a convex surface facing the object side, and has a meniscus shape.

CITATION LIST

Patent Documents

Patent Document 1: JP-A No. 2007-264180
Patent Document 2: JP-A No. 2007-298572

SUMMARY OF INVENTION

Problems to be Solved by the Invention

The image pickup lenses described in Patent Documents 1 and 2 each include five lenses to exhibit high performance. From the viewpoint of their optical length, however, they are not adequately designed to reduce their size and thickness.

The present invention has been made in view of the above circumstances and has an object to provide a small-size, low-cost, high-performance image pickup lens for a solid-state image pickup element.

Means for Solving the Problems

The above-mentioned problem can be addressed when the image pickup lens for a solid-state image pickup element is configured as described below.

The image pickup lens described in aspect 1 of the invention includes, in the order from an object side, a first lens, a second lens, a third lens, a fourth lens, and a fifth lens. The first lens has a convex surface facing the object side on an optical axis and has a positive refractive power. The second lens has a concave surface facing an image side on the optical axis and has a negative refractive power. The third lens has a convex surface facing the object side on the optical axis and has a meniscus shape. The fourth lens has a convex surface facing the image side on the optical axis, has a positive refractive power, and has a meniscus shape. The fifth lens has a concave surface facing the image side on the optical axis, has a negative refractive power, and has a meniscus shape.

The image pickup lens described in aspect 2 of the invention satisfies conditional expressions (1) and (2) below, which concern the Abbe number of a material used for the first lens and the second lens:

$$45<\nu1<90 \quad (1)$$

$$22<\nu2<35 \quad (2)$$

where $\nu1$ is the Abbe number for d-line of the first lens, and $\nu2$ is the Abbe number for d-line of the second lens.

Conditional expression (1) above defines the Abbe number of the first lens. If the lower limit indicated by conditional expression (1) is exceeded, the variance value difference from the second lens is decreased so that chromatic aberration correction is insufficient. If, on the contrary, the upper limit is exceeded, the balance between axial chromatic aberration and chromatic aberration of magnification is impaired so that performance deterioration occurs at the periphery of an image area.

Conditional expression (2) above defines the Abbe number of the second lens. If the lower limit indicated by conditional expression (2) is exceeded, the balance between axial chromatic aberration and off-axis chromatic aberration is impaired so that performance deterioration occurs at the periphery of the image area. If, on the contrary, the upper limit is exceeded, the variance value difference from the first lens is decreased so that chromatic aberration correction is insufficient.

The image pickup lens described in aspect 3 of the invention is configured so that the second lens, the third lens, the fourth lens, and the fifth lens are so-called plastic lenses that have at least one aspherical surface and are made of a resin material.

Cost reduction can be achieved when at least the second lens, the third lens, the fourth lens, and the fifth lens are made of an inexpensive resin material exhibiting high production efficiency.

The image pickup lens described in aspect 4 of the invention is configured so that an aperture stop is positioned on the object side of the first lens.

As the aperture stop is positioned on the object side of the first lens, it is easy to reduce a CRA (Chief Ray Angle) and obtain sufficient light intensity at the periphery of an image surface at which light intensity decreases.

The image pickup lens described in aspect 5 of the invention is configured so that the object-side surface and image-side surface of the fifth lens have an aspherical shape, which contains at least one inflection point between the center and the periphery of the lens.

As the object-side surface and image-side surface of the fifth lens have an aspherical shape that contains at least one inflection point between the center and the periphery of the lens, it is possible to obtain adequate off-axis performance and CRA.

The image pickup lens described in aspect 6 of the invention is configured so that the first lens and the second lens satisfy conditional expressions (3) and (4) below:

$$0.50<f1/f<1.00 \quad (3)$$

$$-1.50<f2/f<-0.65 \quad (4)$$

where f is the composite focal length of lenses included in the entire image pickup lens, f1 is the focal length of the first lens, and f2 is the focal length of the second lens.

Conditional expression (3) above defines the range of the focal length of the first lens with respect to the focal length of the entire image pickup lens. If the lower limit indicated by conditional expression (3) is exceeded, the focal length of the first lens is too small. This makes it difficult to correct spherical aberration and coma aberration. If, on the contrary, the upper limit is exceeded, the optical length is too great so that the thickness of the image pickup lens cannot be sufficiently reduced.

Conditional expression (4) above defines the range of the focal length of the second lens with respect to the focal length of the entire image pickup lens. If the lower limit indicated by conditional expression (4) is exceeded, the power of the second lens is insufficient so that chromatic aberration cannot be adequately corrected. If, on the contrary, the upper limit is exceeded, the focal length of the second lens is too small. This not only makes it difficult to correct spherical aberration and coma aberration, but also decreases manufacturing error sensitivity.

The image pickup lens described in aspect 7 of the invention is configured so that the fourth lens and the fifth lens satisfy conditional expressions (5) and (6) below:

$$0.9<f4/f<1.50 \quad (5)$$

$$-1.70<f5/f<-0.85 \quad (6)$$

where f is the composite focal length of lenses included in the entire image pickup lens, f4 is the focal length of the fourth lens, and f5 is the focal length of the fifth lens.

Conditional expression (5) above defines the range of the focal length of the fourth lens with respect to the focal length of the entire image pickup lens. If the lower limit indicated by conditional expression (5) is exceeded, the focal length of the fourth lens is too small. This makes it difficult to correct astigmatism and coma aberration, and decreases the manufacturing error sensitivity. If, on the contrary, the upper limit is exceeded, chromatic aberration of magnification and astigmatism are not adequately corrected so that expected performance is not obtained.

Conditional expression (6) above defines the range of the focal length of the fifth lens with respect to the focal length of the entire image pickup lens. If the lower limit indicated by conditional expression (6) is exceeded, the power of the fifth lens is insufficient. This makes it difficult to decrease the optical length. If, on the contrary, the upper limit is exceeded, it is difficult to decrease the CRA, thereby decreasing the manufacturing error sensitivity at low image height.

The image pickup lens described in aspect 8 of the invention is configured so that the first lens and the third lens satisfy conditional expression (7) below:

$$-0.15<f1/f3<0.37 \quad (7)$$

where f1 is the focal length of the first lens, and f3 is the focal length of the third lens.

Conditional expression (7) above defines the ratio between the focal length of the first lens and the focal length of the third lens. If the lower limit indicated by conditional expression (7) is exceeded, the focal length of the third lens is negative and too small. This makes it difficult to provide aberration correction. If, on the contrary, the upper limit is exceeded, the focal length of the third lens is positive and too small. This impairs the balance between astigmatism and coma aberration and decreases the manufacturing error sensitivity.

The image pickup lens described in aspect 9 of the invention is configured so that the second lens, the third lens, and the fourth lens satisfy conditional expression (8) below:

$$0.0<f2\cdot3\cdot4 \quad (8)$$

where f2·3·4 is the composite focal length of the second, third, and fourth lenses.

Conditional expression (8) above defines the composite focal length of the second, third, and fourth lens. If the lower limit indicated by conditional expression (8) is exceeded, the negative power of the second lens is too strong so that the manufacturing error sensitivity is excessively low, or the positive power of the fourth lens is too weak so that it is difficult to correct astigmatism and distortion.

The image pickup lens described in aspect 10 of the invention is configured so that the first lens, the second lens, the third lens, the fourth lens, and the fifth lens satisfy conditional expressions (9), (10), and (11) below:

$$f1<|f2|<|f3| \quad (9)$$

$$f1<f4<|f3| \quad (10)$$

$$f1<|f5|<|f3| \quad (11)$$

where f1 is the focal length of the first lens, f2 is the focal length of the second lens, f3 is the focal length of the third lens, f4 is the focal length of the fourth lens, and f5 is the focal length of the fifth lens.

Conditional expression (9) above defines the power relationship, that is, the focal length relationship, between the first lens, the second lens, and the third lens. If the lower limit indicated by conditional expression (9) is exceeded, the negative power of the second lens is too strong. This increases the optical length and decreases the manufacturing error sensitivity. If, on the contrary, the upper limit is exceeded, the power of the third lens is too strong so that it is difficult to obtain adequate off-axis performance.

Conditional expression (10) above defines the power relationship, that is, the focal length relationship, between the first lens, the third lens, and the fourth lens. If the lower limit indicated by conditional expression (10) is exceeded, the power of the fourth lens is too strong. This increases the optical length and makes it difficult to correct astigmatism and distortion. If, on the contrary, the upper limit is exceeded, the power of the third lens is too strong so that it is difficult to obtain adequate off-axis performance.

Conditional expression (11) above defines the power relationship, that is, the focal length relationship, between the first lens, the third lens, and the fifth lens. If the lower limit indicated by conditional expression (11) is exceeded, the negative power of the fifth lens is too strong. This makes it difficult to correct coma aberration and astigmatism. If, on the contrary, the upper limit is exceeded, the power of the third lens is too strong so that it is difficult to obtain adequate off-axis performance.

The third lens has a weaker power than the other lenses. However, its front and rear aspherical surfaces effectively work to reduce an aberration caused within the second lens. Particularly, its fourth-order aspherical coefficient effectively works and plays an important role to exhibit performance characteristics specific to a combination of five lenses.

The image pickup lens described in aspect 11 of the invention is configured so that the curvature radius of the first lens satisfies conditional expression (12) below:

$$-0.40<r1/r2<0.10 \quad (12)$$

where r1 is the curvature radius of the object-side surface of the first lens, and r2 is the curvature radius of the image-side surface of the first lens.

Conditional expression (12) above defines the lens shape of the first lens. If the lower limit indicated by conditional expression (12) is exceeded, the optical length cannot be readily reduced. In addition, the error sensitivity prevailing during the manufacture of the first lens becomes low. If, on the contrary, the upper limit is exceeded, it is difficult to maintain a proper aberration balance so that expected performance is not obtained.

The image pickup lens described in aspect 12 of the invention is configured so that the curvature radius of the fourth lens satisfies conditional expression (13) below:

$$1.4<r7/r8<3.0 \quad (13)$$

where r7 is the curvature radius of the object-side surface of the fourth lens, and r8 is the curvature radius of the image-side surface of the fourth lens.

Conditional expression (13) above defines the lens shape of the fourth lens. If the lower limit indicated by conditional expression (13) is exceeded, the power of the fourth lens is too weak. Consequently, performance deterioration occurs because it is difficult to correct various aberrations. If, on the contrary, the upper limit is exceeded, the fourth lens has an excessively strong power or has a small degree of meniscus curvature. In this instance, too, it is difficult to maintain a proper aberration balance so that expected performance is not obtained.

The image pickup lens described in aspect 13 of the invention is configured so that its image pickup optical system's optical length and focal length satisfy conditional expression (14) below:

$$1.05<L/f<1.30 \quad (14)$$

where L is the distance between the front surface of the first lens and the image surface, and f is the composite focal length of lenses included in the entire image pickup lens.

Conditional expression (14) above defines the optical length with respect to the focal length. If the lower limit indicated by conditional expression (14) is exceeded, it is difficult to correct various aberrations due to an excessively decreased optical length. In addition, the manufacturing error sensitivity becomes excessively low. If, on the contrary, the upper limit is exceeded, it is difficult to reduce the thickness of the image pickup lens due to an excessively increased optical length.

The image pickup lens described in claim 14 of the invention is configured so that the diameter of the aperture stop satisfies conditional expression (15) below:

$$0.30<CA1/f<0.50 \quad (15)$$

where CA1 is the diameter of the aperture stop, and f is the composite focal length of lenses included in the entire image pickup lens.

Conditional expression (15) above defines the F-number (Fno), which is an indication of lens brightness. If the lower limit indicated by conditional expression (15) is exceeded, the F-number is excessively great so that requested brightness is not achieved in most cases. If, on the contrary, the upper limit is exceeded, the F-number is excessively small or the distance between an aperture stop (F-number light flux restriction plate) and the front surface of the first lens is excessively great. In either of these cases, expected optical performance is not obtained.

Effects of the Invention

The image pickup lens according to the present invention includes five lenses (the first to fifth lenses). Further, the third lens plays a role that is not found in a conventional four-lens configuration. Therefore, the present invention makes it possible to provide a high-performance, low-cost, compact lens in which various aberrations are properly corrected to support large-size, high-resolution image pickup elements having highly minute pixels.

BEST MODE FOR CARRYING OUT THE INVENTION

Embodiments of the present invention will now be described by using concrete numerical values. In the first to sixth embodiments, the image pickup lens for a solid-state image pickup element includes, in the order from the object side, an aperture stop S, a first lens L1, a second lens L2, a third lens L3, a fourth lens L4, a fifth lens L5, a plane-parallel glass plate IR, and an image surface.

In the first to sixth embodiments, the second lens L2, the third lens L3, the fourth lens L4, and the fifth lens L5 are so-called plastic lenses that have at least one aspherical surface and are made of a resin material. It should also be noted that the aperture stop S is positioned on the object side of the first lens L1.

The object-side surface and image-side surface of the fifth lens L5 have an aspherical shape that contains at least one inflection point between the center and the periphery of the lens. The aspherical shape in each embodiment is expressed by the following aspherical surface formula in which the vertex of a plane is regarded as the origin, the Z-axis is oriented in the direction of an optical axis, and the height measured perpendicularly to the optical axis is h:

$$Z=(h2/r)/[1+\{1-(1+K)(h2/r2)\}^{1/2}]+A_4h^4+A_6h^6+A_8h^8+\cdots$$

It should be noted that the following symbols are used in the above aspherical surface formula and in the description of each embodiment:

Ai: ith-order aspherical coefficient
r: Curvature radius
K: Conical constant
f: Focal length of the entire image pickup lens
F: F-number
d: On-axis surface spacing
nd: Refractive index of a lens material relative to d-line
ν: Abbe number of a lens material In the subsequent description, the exponent of 10 (e.g., $4.5\times10^{-04}$) is expressed by using the letter E (e.g., 4.5E-04), and surface numbers for lens data are sequentially assigned so that, for example, the object-side surface of the first lens L1 is surface 1.

First Embodiment

Figure 1:
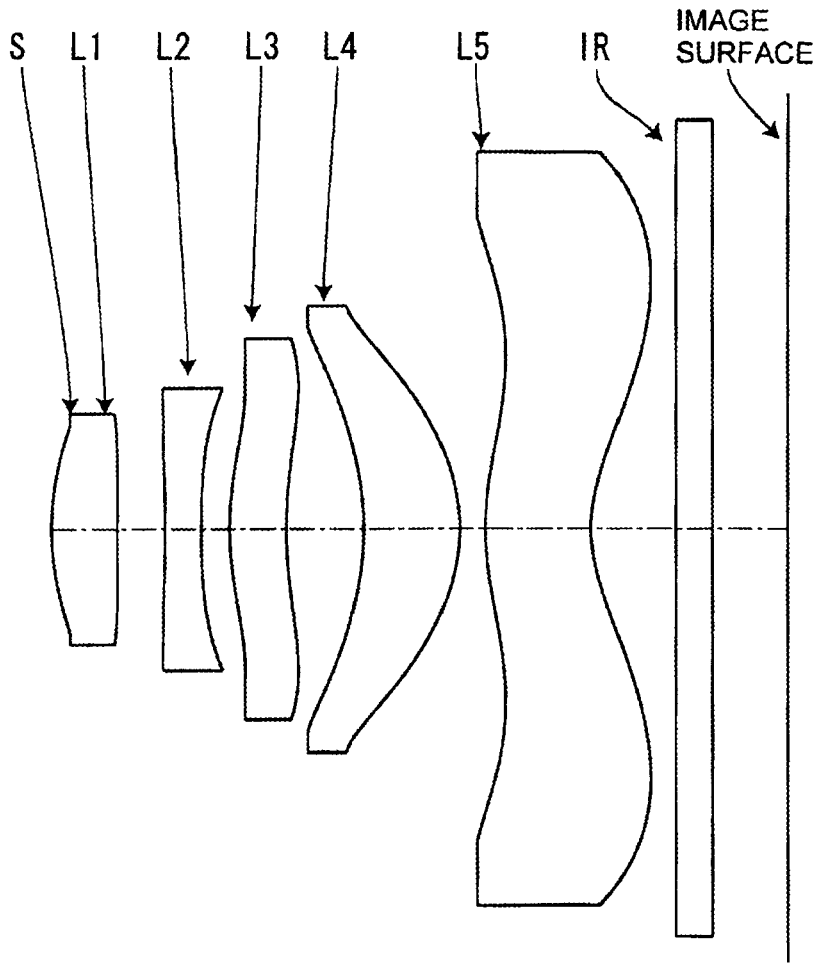
FIG. 1 is a cross-sectional view of an image pickup lens according to a first embodiment of the present invention.
Figure 2:
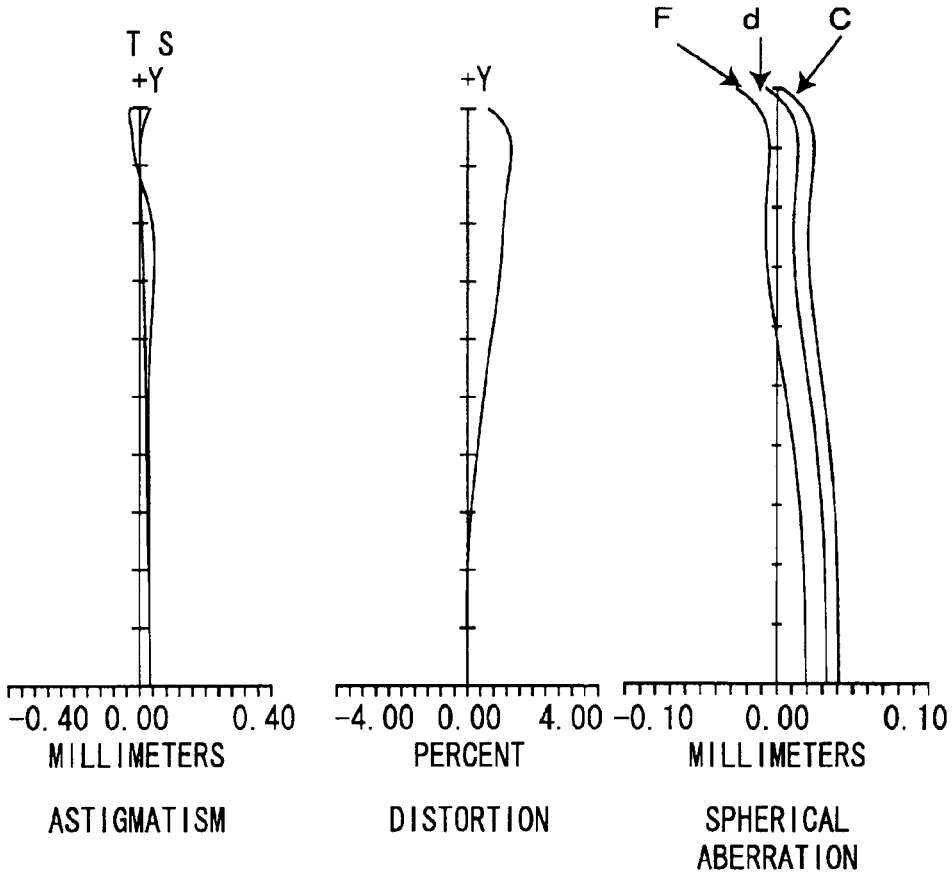
FIG. 2 shows various aberrations of the image pickup lens according to the first embodiment of the present invention.

Table 1 shows numerical data about the image pickup lens according to the first embodiment. FIG. 1 is a cross-sectional view of the image pickup lens. FIG. 2 shows various aberrations.

TABLE 1

| Surface Number | r | d | n d | ν | K |
|---|---|---|---|---|---|
| 1 (S) | 2.297 | 0.550 | 1.5247 | 56.26 | 0.175 |
| 2 | 8384.615 | 0.411 | | | 0 |
| 3 | −6.170 | 0.299 | 1.6142 | 25.58 | 2.471 |
| 4 | 8.586 | 0.242 | | | 0 |
| 5 | 2.383 | 0.481 | 1.5247 | 56.26 | −7.218 |
| 6 | 3.460 | 0.658 | | | −1.443 |
| 7 | −2.320 | 0.815 | 1.5094 | 56.00 | −0.455 |
| 8 | −1.502 | 0.217 | | | −0.645 |
| 9 | 2.288 | 0.897 | 1.5094 | 56.00 | −3.909 |
| 10 | 1.274 | 0.714 | | | −3.515 |
| 11 | ∞ | 0.300 | 1.5168 | 64.20 | |
| 12 | ∞ | 0.635 | | | |

| Surface Number | A4 | A6 | A8 | A10 | A12 | A14 | A16 |
|---|---|---|---|---|---|---|---|
| 1 (S) | −5.423E−3 | −2.923E−3 | −1.511E−2 | 2.424E−3 | −1.233E−2 | 3.275E−3 | 4.002E−3 |
| 2 | 8.525E−3 | −2.136E−2 | −1.410E−2 | −1.071E−2 | 3.924E−3 | 0 | 0 |
| 3 | 1.427E−1 | −1.124E−1 | 5.307E−2 | −1.649E−2 | −1.541E−2 | 1.183E−2 | 0 |
| 4 | 9.163E−2 | −4.267E−2 | 9.557E−3 | 1.336E−2 | −1.497E−2 | 5.154E−3 | 0 |
| 5 | −4.203E−2 | −4.711E−3 | −2.518E−3 | 2.523E−3 | 0 | 0 | 0 |
| 6 | −4.458E−2 | −3.915E−3 | −4.687E−4 | 4.421E−4 | 0 | 0 | 0 |
| 7 | 5.934E−2 | −4.778E−2 | 2.552E−2 | −7.375E−3 | 9.592E−4 | 0 | 0 |
| 8 | 2.946E−2 | −6.592E−3 | −1.052E−3 | 1.407E−3 | −1.257E−4 | 0 | 0 |
| 9 | −6.925E−2 | 1.547E−2 | −1.984E−3 | 4.124E−5 | 2.050E−5 | −1.537E−6 | −5.993E−9 |
| 10 | −4.400E−2 | 1.076E−2 | −2.049E−3 | 2.486E−4 | −1.983E−5 | 1.014E−6 | −2.577E−8 |

f = 4.815 F = 2.8

Second Embodiment

Figure 3:
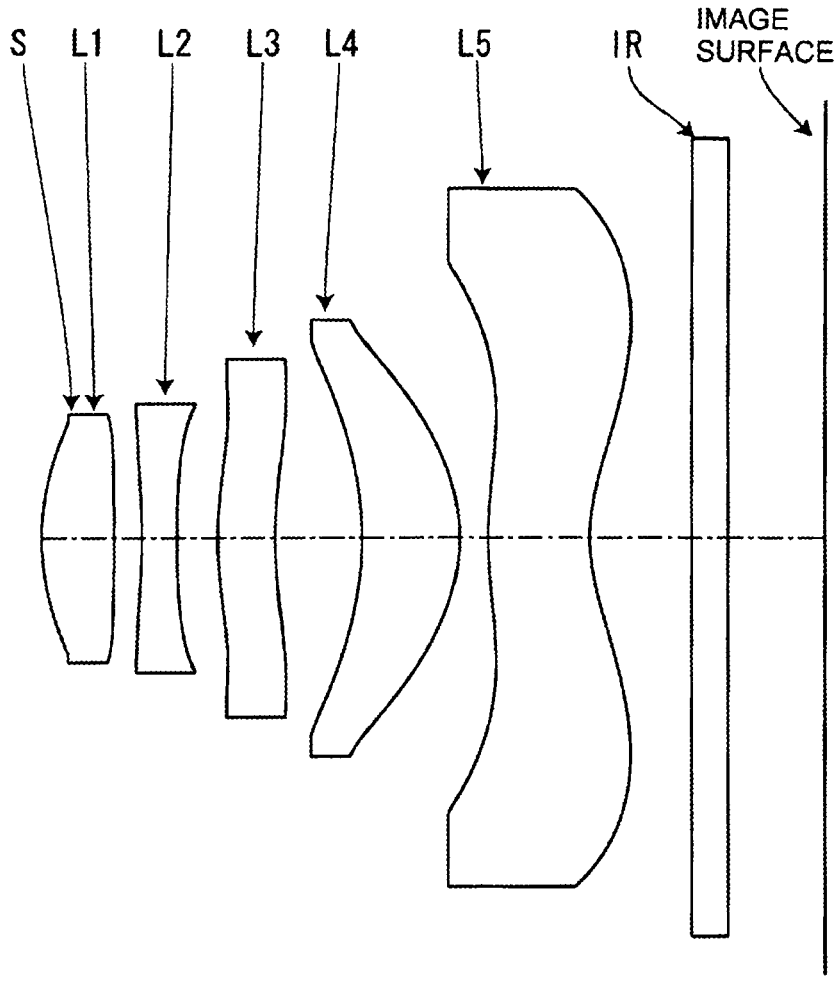
FIG. 3 is a cross-sectional view of the image pickup lens according to a second embodiment of the present invention.
Figure 4:
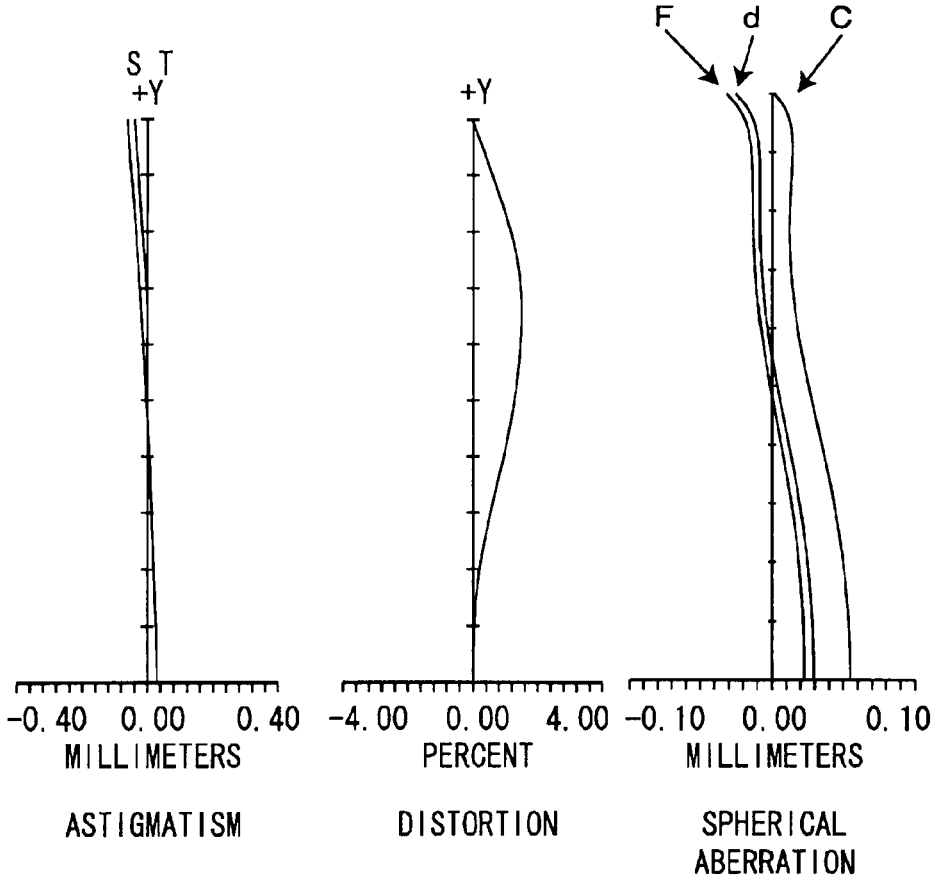
FIG. 4 shows various aberrations of the image pickup lens according to the second embodiment of the present invention.

Table 2 shows numerical data about the image pickup lens according to the second embodiment. FIG. 3 is a cross-sectional view of the image pickup lens. FIG. 4 shows various aberrations.

TABLE 2

| Surface Number | r | d | n d | ν | K |
|---|---|---|---|---|---|
| 1 (S) | 2.035 | 0.605 | 1.497 | 81.60 | 0.145 |
| 2 | −19.788 | 0.233 | | | 0 |
| 3 | −4.221 | 0.295 | 1.6142 | 25.58 | −1.602 |
| 4 | 13.376 | 0.341 | | | 0 |
| 5 | 3.098 | 0.486 | 1.5247 | 56.26 | −11.308 |
| 6 | 4.140 | 0.731 | | | 0.271 |
| 7 | −2.446 | 0.818 | 1.5247 | 56.26 | −0.334 |
| 8 | −1.493 | 0.239 | | | −0.653 |
| 9 | 3.310 | 0.855 | 1.5247 | 56.26 | −12.446 |
| 10 | 1.488 | 0.849 | | | −4.788 |
| 11 | ∞ | 0.300 | 1.5168 | 64.20 | |
| 12 | ∞ | 0.803 | | | |

| Surface Number | A4 | A6 | A8 | A10 | A12 | A14 | A16 |
|---|---|---|---|---|---|---|---|
| 1 (S) | −7.452E−3 | −1.617E−4 | −1.335E−2 | 4.383E−3 | −9.221E−3 | 4.483E−3 | −3.834E−3 |
| 2 | 1.998E−2 | −2.240E−2 | −1.467E−2 | −1.152E−2 | 3.209E−3 | 0 | 0 |
| 3 | 1.470E−1 | −1.118E−1 | 5.112E−2 | −1.648E−2 | −1.373E−2 | 1.325E−2 | 0 |
| 4 | 9.526E−2 | −4.060E−2 | 1.128E−2 | 1.414E−2 | −1.462E−2 | 5.794E−3 | 0 |
| 5 | −4.356E−2 | −4.909E−3 | −2.662E−3 | 2.513E−3 | 0 | 0 | 0 |
| 6 | −4.106E−2 | −3.596E−3 | 3.640E−7 | 6.811E−4 | 0 | 0 | 0 |
| 7 | 5.620E−2 | −4.763E−2 | 2.579E−2 | −7.309E−3 | 9.426E−4 | 0 | 0 |
| 8 | 3.109E−2 | −6.202E−3 | −9.8890−4 | 1.388E−3 | −1.345E−4 | 0 | 0 |
| 9 | −7.078E−2 | 1.540E−2 | −1.993E−3 | 4.351E−5 | 2.090E−5 | 1.538E−6 | −1.030E−8 |
| 10 | −4.561E−2 | 1.071E−2 | −2.036E−3 | 2.488E−4 | −1.998E−5 | 9.963E−7 | −2.502E−8 |

f = 5.372 F = 2.8

Third Embodiment

Figure 5:
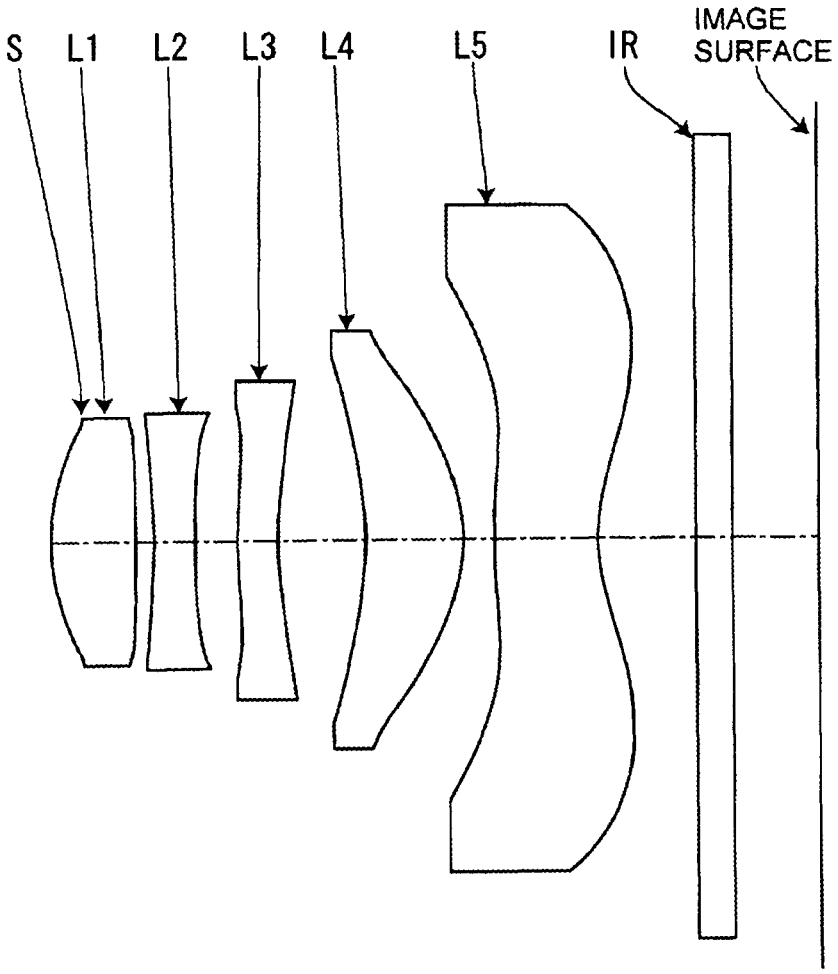
FIG. 5 is a cross-sectional view of the image pickup lens according to a third embodiment of the present invention.
Figure 6:
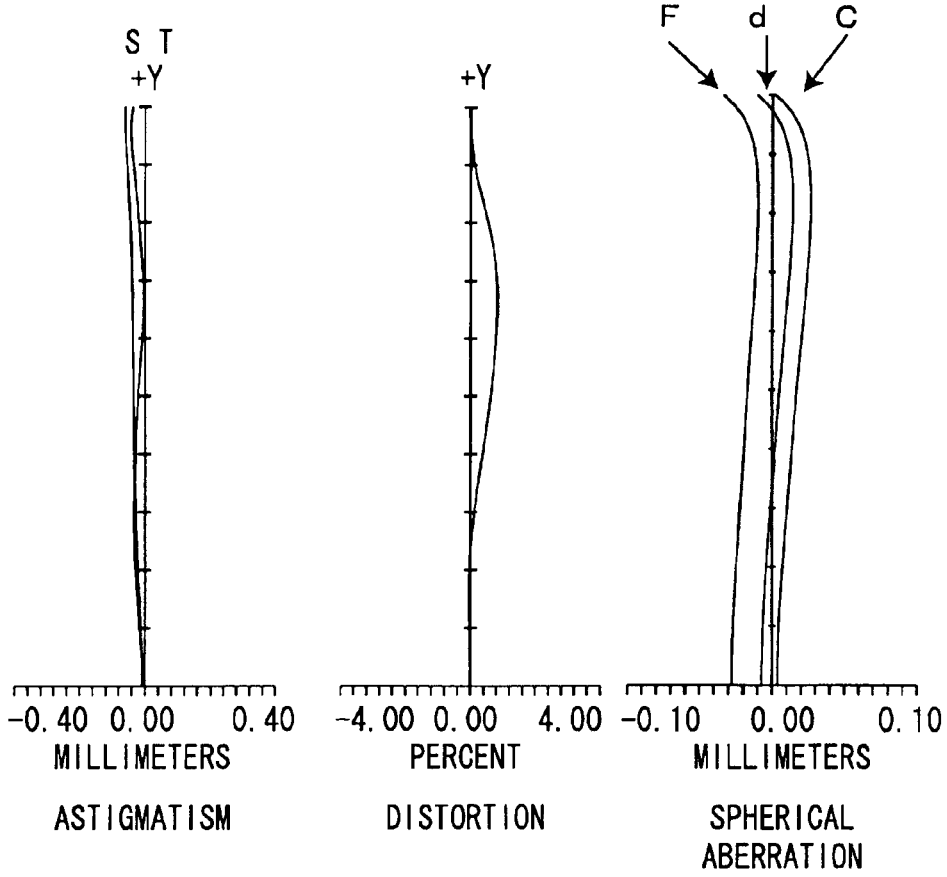
FIG. 6 shows various aberrations of the image pickup lens according to the third embodiment of the present invention.

Table 3 shows numerical data about the image pickup lens according to the third embodiment. FIG. 5 is a cross-sectional view of the image pickup lens. FIG. 6 shows various aberrations.

TABLE 3

| Surface Number | r | d | n d | ν | K |
|---|---|---|---|---|---|
| 1 (S) | 2.093 | 0.608 | 1.5441 | 56.00 | 0.123 |
| 2 | −25.611 | 0.211 | | | 0 |
| 3 | −4.074 | 0.307 | 1.5850 | 30.00 | −1.357 |
| 4 | 11.977 | 0.336 | | | 0 |
| 5 | 3.166 | 0.478 | 1.5441 | 56.00 | −11.659 |
| 6 | 4.064 | 0.731 | | | 0.351 |
| 7 | −2.478 | 0.790 | 1.5247 | 56.26 | −0.290 |
| 8 | −1.540 | 0.274 | | | −0.648 |
| 9 | 3.353 | 0.859 | 1.5247 | 56.26 | −12.746 |
| 10 | 1.488 | 0.794 | | | −4.901 |
| 11 | ∞ | 0.300 | 1.5168 | 64.20 | |
| 12 | ∞ | 0.713 | | | |

| Surface Number | A4 | A6 | A8 | A10 | A12 | A14 | A16 |
|---|---|---|---|---|---|---|---|
| 1 (S) | −8.004E−3 | 4.932E−5 | −1.335E−2 | 4.345E−3 | −9.202E−3 | 4.586E−3 | −3.708E−3 |
| 2 | 1.747E−2 | −2.375E−2 | −1.468E−2 | −1.094E−2 | 3.436E−3 | 0 | 0 |
| 3 | 1.466E−1 | −1.114E−1 | 5.110E−2 | −1.663E−2 | −1.384E−2 | 1.328E−2 | 0 |
| 4 | 9.639E−2 | −4.030E−2 | 1.113E−2 | 1.390E−2 | −1.439E−2 | 5.879E−3 | 0 |
| 5 | −4.371E−2 | −5.274E−3 | −3.020E−3 | 2.317E−3 | 0 | 0 | 0 |
| 6 | −4.084E−2 | −3.546E−3 | −2.715E−5 | 7.200E−4 | 0 | 0 | 0 |
| 7 | 5.558E−2 | −4.774E−2 | 2.575E−2 | −7.317E−3 | 9.431E−4 | 0 | 0 |
| 8 | 3.087E−2 | −6.449E−3 | −1.021E−3 | 1.386E−3 | −1.344E−4 | 0 | 0 |
| 9 | −7.043E−2 | 1.531E−2 | −2.006E−3 | 4.195E−5 | 2.091E−5 | −1.493E−6 | 8.400E−10 |
| 10 | −4.574E−2 | 1.069E−2 | −2.047E−3 | 2.484E−4 | −1.994E−5 | 1.002E−6 | −2.527E−8 |

f = 5.269 F = 2.8

Fourth Embodiment

Figure 7:
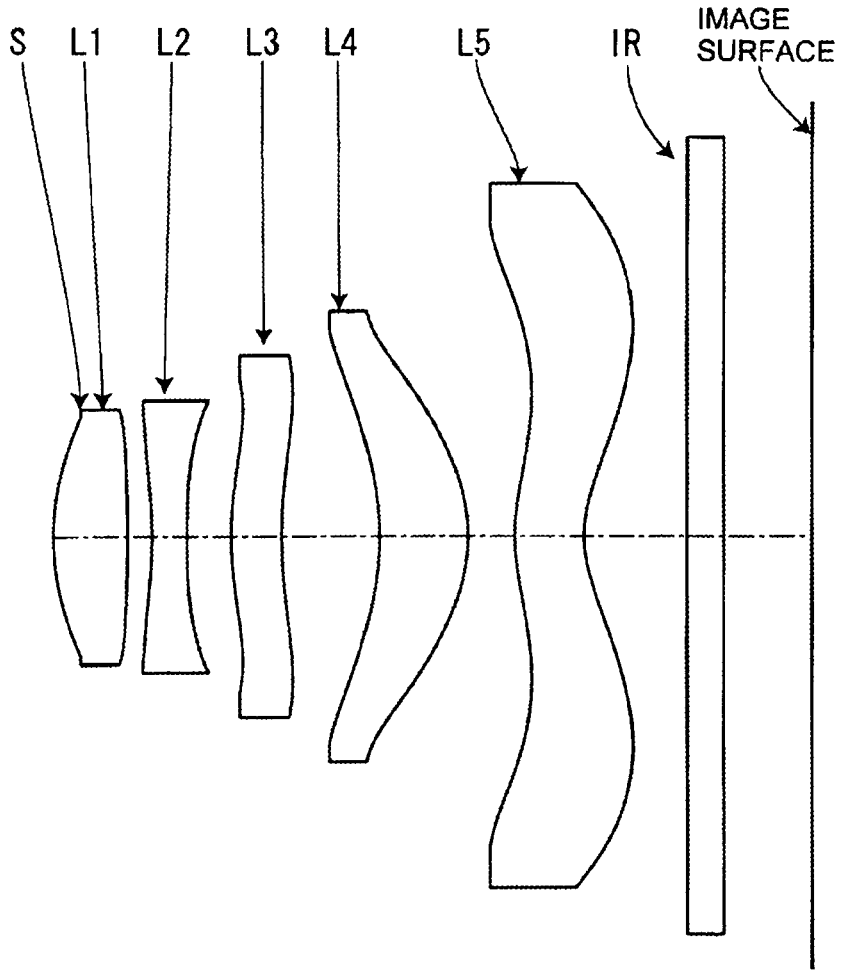
FIG. 7 is a cross-sectional view of the image pickup lens according to a fourth embodiment of the present invention.
Figure 8:
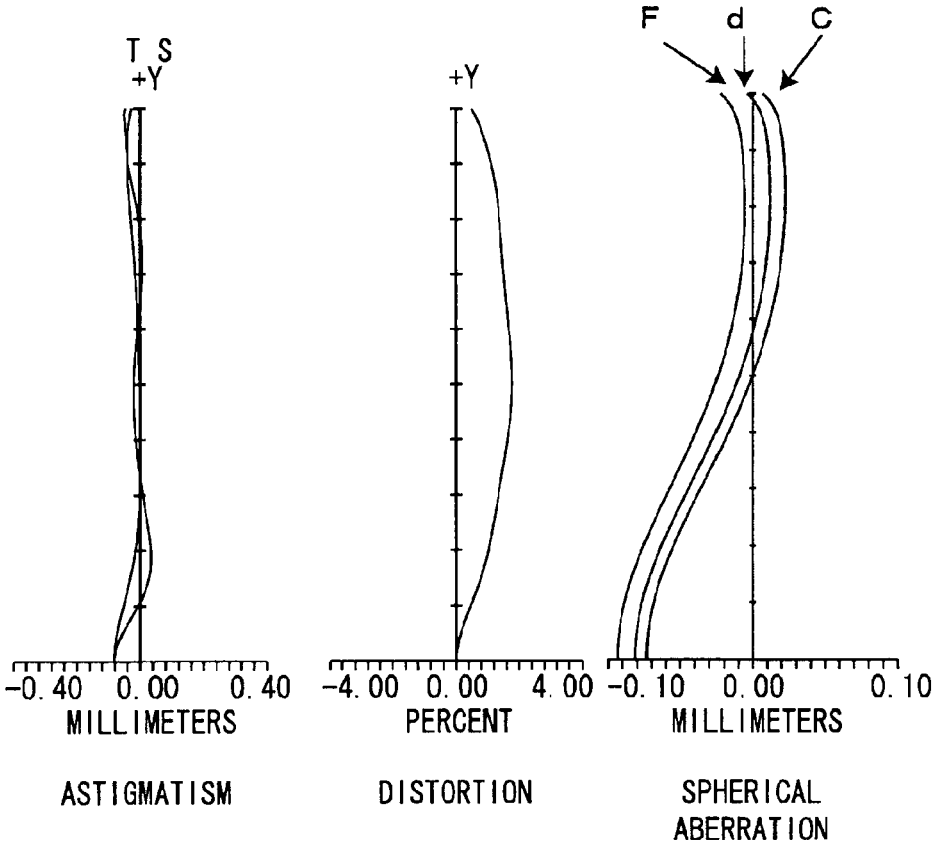
FIG. 8 shows various aberrations of the image pickup lens according to the fourth embodiment of the present invention.

Table 4 shows numerical data about the image pickup lens according to the fourth embodiment. FIG. 7 is a cross-sectional view of the image pickup lens. FIG. 8 shows various aberrations.

TABLE 4

| Surface Number | r | d | n d | ν | K |
|---|---|---|---|---|---|
| 1 (S) | 2.119 | 0.626 | 1.5441 | 56.00 | 0.177 |
| 2 | −11.544 | 0.208 | | | 0 |
| 3 | −3.147 | 0.298 | 1.5850 | 30.00 | −5.094 |
| 4 | 9.796 | 0.373 | | | 0 |
| 5 | 2.701 | 0.428 | 1.5441 | 56.00 | −11.168 |
| 6 | 3.842 | 0.837 | | | 0.129 |
| 7 | −2.253 | 0.750 | 1.5247 | 56.26 | −0.654 |
| 8 | −1.467 | 0.401 | | | −0.694 |
| 9 | 1.656 | 0.587 | 1.5247 | 56.26 | −10.501 |
| 10 | 0.981 | 0.874 | | | −4.578 |
| 11 | ∞ | 0.300 | 1.5168 | 64.20 | |
| 12 | ∞ | 0.742 | | | |

| Surface Number | A4 | A6 | A8 | A10 | A12 | A14 | A16 |
|---|---|---|---|---|---|---|---|
| 1 (S) | −7.510E−3 | 1.743E−3 | −1.246E−2 | 5.493E−3 | −8.377E−3 | 4.978E−3 | −3.500E−3 |
| 2 | 2.507E−2 | −1.481E−2 | −1.129E−2 | −1.181E−2 | 3.172E−3 | 0 | 0 |
| 3 | 1.526E−1 | −1.113E−1 | 5.074E−2 | −1.533E−2 | −1.395E−2 | 1.133E−2 | 0 |
| 4 | 9.710E−2 | −4.050E−2 | 1.124E−2 | 1.365E−2 | −1.474E−2 | 5.407E−3 | 0 |
| 5 | −3.599E−2 | −8.738E−3 | −4.179E−3 | 2.048E−3 | 0 | 0 | 0 |
| 6 | −4.051E−2 | −4.801E−3 | −6.520E−4 | 5.650E−4 | 0 | 0 | 0 |
| 7 | 6.564E−2 | −4.702E−2 | 2.6070−2 | −7.359E−3 | 8.648E−4 | 0 | 0 |
| 8 | 3.490E−2 | −3.356E−3 | −1.098E−3 | 1.296E−3 | −1.421E−4 | 0 | 0 |
| 9 | −7.077E−2 | 1.589E−2 | −1.963E−3 | 4.145E−5 | 2.045E−5 | −1.557E−6 | −2.866E−9 |
| 10 | −5.003E−2 | 1.088E−2 | −1.968E−3 | 2.477E−4 | −2.068E−5 | 9.622E−7 | −1.548E−8 |

f = 5.187 F = 2.7

Fifth Embodiment

Figure 9:
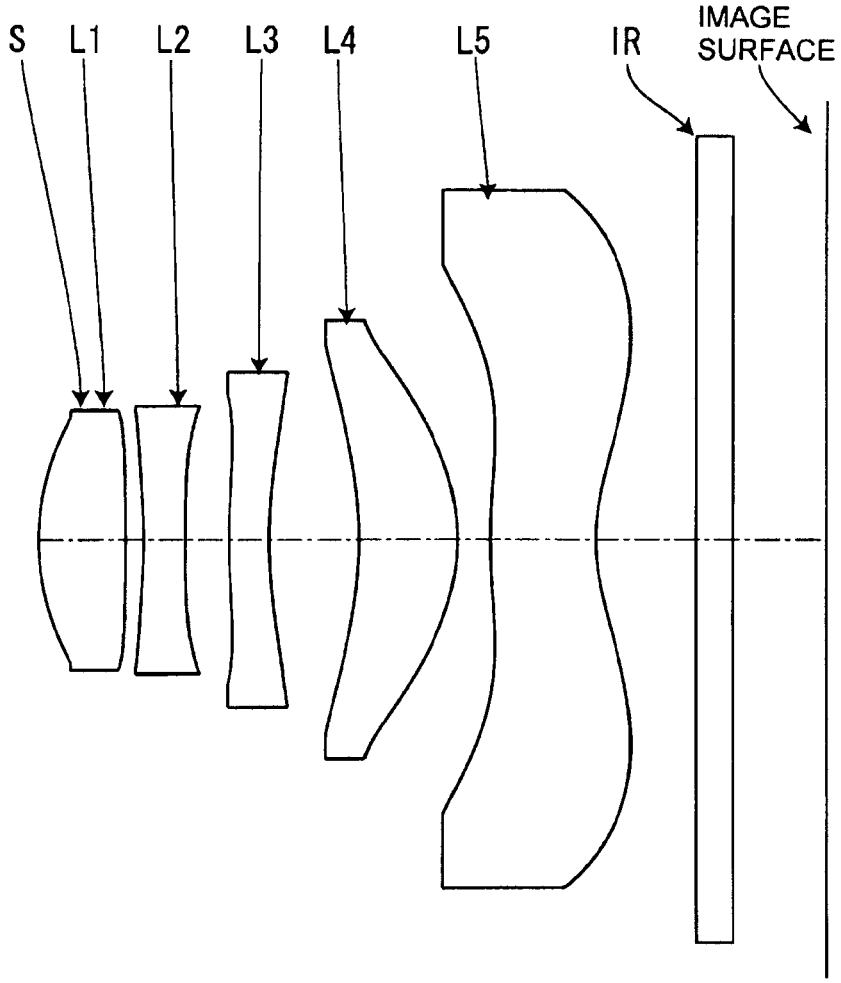
FIG. 9 is a cross-sectional view of the image pickup lens according to a fifth embodiment of the present invention.
Figure 10:
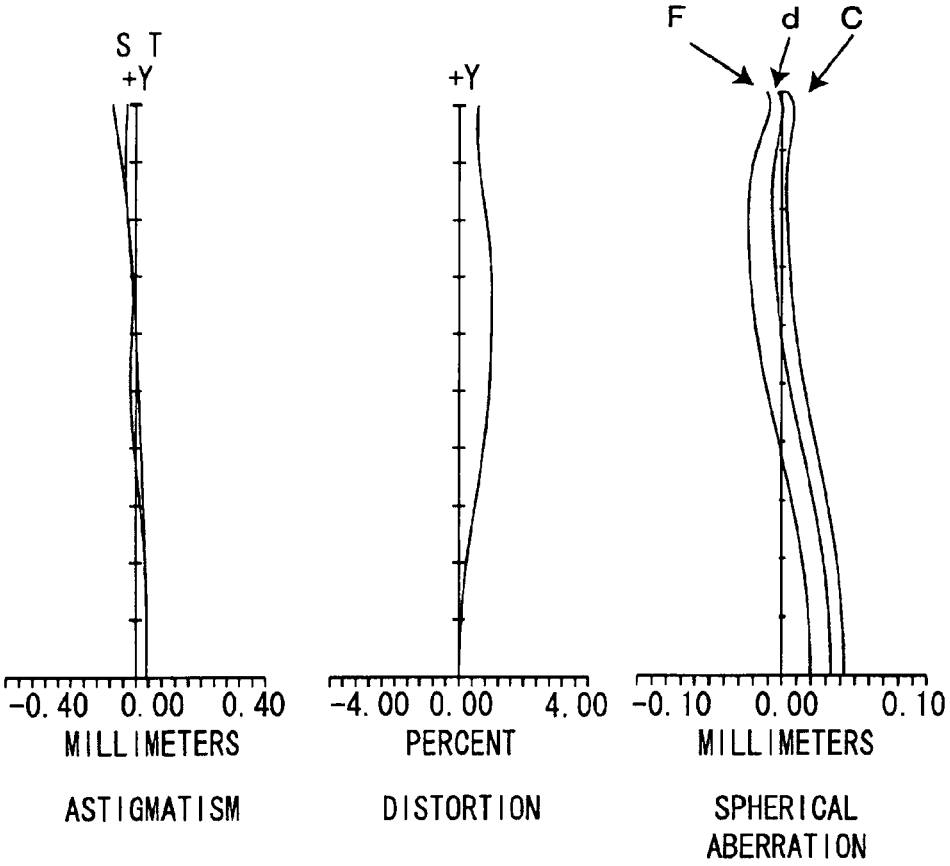
FIG. 10 shows various aberrations of the image pickup lens according to the fifth embodiment of the present invention.

Table 5 shows numerical data about the image pickup lens according to the fifth embodiment. FIG. 9 is a cross-sectional view of the image pickup lens. FIG. 10 shows various aberrations.

TABLE 5

| Surface Number | r | d | n d | ν | K |
|---|---|---|---|---|---|
| 1 (S) | 1.974 | 0.720 | 1.5311 | 5600 | 0.260 |
| 2 | −14.375 | 0.150 | | | 0 |
| 3 | −4.100 | 0.350 | 1.6142 | 25.58 | 1.248 |
| 4 | 55.800 | 0.360 | | | 0 |
| 5 | 5.600 | 0.340 | 1.5311 | 56.00 | −20.645 |
| 6 | 3.868 | 0.750 | | | 1.356 |
| 7 | −3.010 | 0,820 | 1.5311 | 56.00 | −0.508 |
| 8 | −1.634 | 0.270 | | | −0.656 |
| 9 | 4.156 | 0.880 | 1.5311 | 56.00 | −29.637 |
| 10 | 1.582 | 0.830 | | | −5.617 |
| 11 | ∞ | 0.300 | 1.5168 | 64.20 | |
| 12 | ∞ | 0.770 | | | |

| Surface Number | A4 | A6 | A8 | A10 | A12 | A14 | A16 |
|---|---|---|---|---|---|---|---|
| 1 (S) | −6.011E−3 | 4.555E−3 | −1.140E−2 | 5.896E−3 | −7.660E−3 | 5.633E−3 | −3.706E−3 |
| 2 | 3.346E−2 | −2.148E−2 | −1.342E−2 | −1.061E−2 | 3.525E−3 | 0 | 0 |
| 3 | 1.407E−1 | −1.057E−1 | 4.976h−2 | −1.790E−2 | −1.431E−2 | 1.182E−2 | 0 |
| 4 | 1.000E−1 | −4.704E−2 | 1.326E−2 | 1.542E−2 | −1.468E−2 | 5.766E−3 | 0 |
| 5 | −5.387E−2 | −6.340E−3 | −1.971E−3 | 2.628E−3 | 0 | 0 | 0 |
| 6 | −4.023E−2 | 2.476E−4 | 1.005E−3 | 6.170E−4 | 0 | 0 | 0 |
| 7 | 5.679E−2 | −4.556E−2 | 2.594E−2 | −7.443E−3 | 8.944E−4 | 0 | 0 |
| 8 | 3.073E−2 | −5.791E−3 | −8.590E−4 | 1.367E−3 | −1.517E−4 | 0 | 0 |
| 9 | −6.996E−2 | 1.530E−2 | −1.966E−3 | 5.619E−5 | 2.207E−5 | −1.613E−6 | −4.417E−8 |
| 10 | −4.594E−2 | 1.064E−2 | −2.039E−3 | 2.506E−4 | −2.003E−5 | 9.526E−7 | −2.202E−8 |

f = 5.700 F = 2.8

Sixth Embodiment

Figure 11:
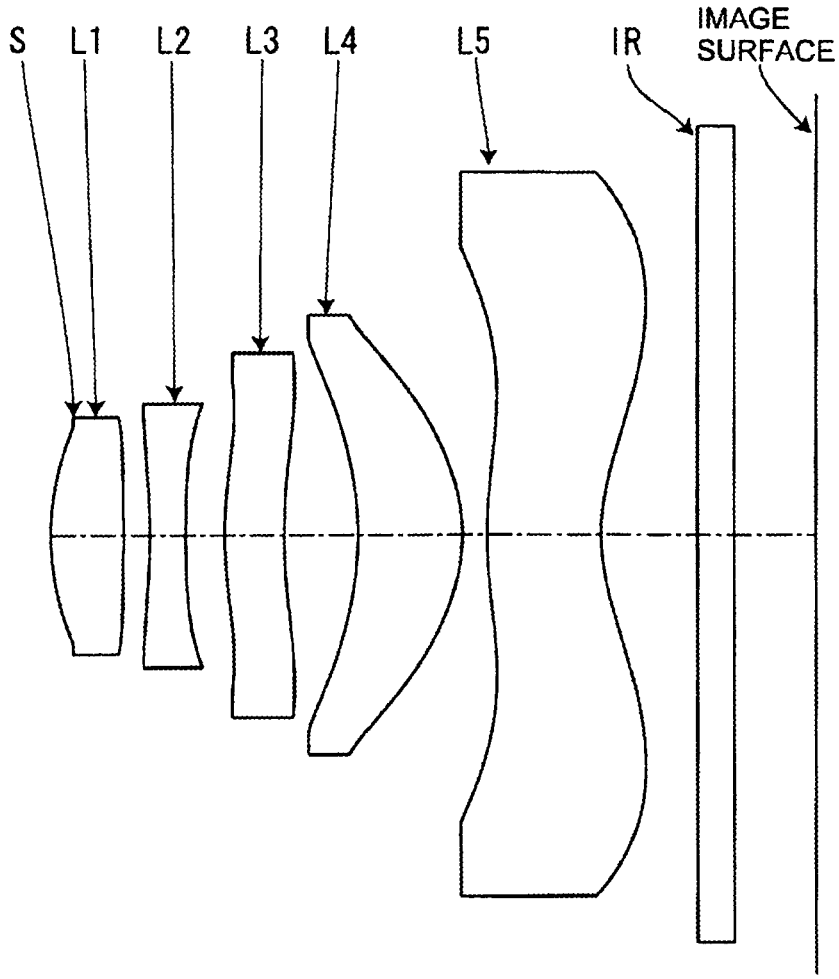
FIG. 11 is a cross-sectional view of the image pickup lens according to a sixth embodiment of the present invention.
Figure 12:
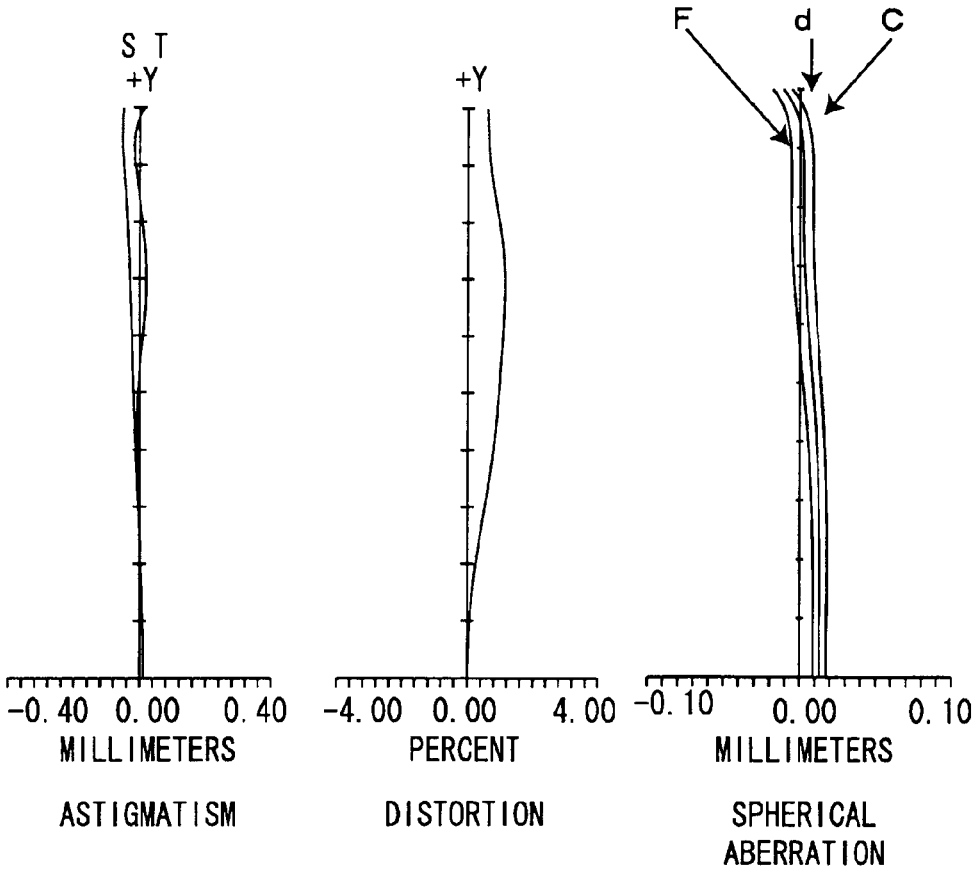
FIG. 12 shows various aberrations of the image pickup lens according to the sixth embodiment of the present invention.

Table 6 shows numerical data about the image pickup lens according to the sixth embodiment. FIG. 11 is a cross-sectional view of the image pickup lens. FIG. 12 shows various aberrations.

TABLE 6

| Surface Number | r | d | n d | ν | K |
|---|---|---|---|---|---|
| 1 (S) | 2.084 | 0.604 | 1.5311 | 56.00 | 0.168 |
| 2 | −21.296 | 0.222 | | | 0 |
| 3 | −3.958 | 0.300 | 1.6142 | 25.58 | −1.423 |
| 4 | 13.768 | 0.323 | | | 0 |
| 5 | 3.075 | 0.497 | 1.5311 | 56.00 | −11.809 |
| 6 | 4.139 | 0.624 | | | 0.275 |
| 7 | −2.412 | 0.870 | 1.5247 | 56.26 | −0.378 |
| 8 | −1.484 | 0.208 | | | −0.649 |
| 9 | 3.407 | 0.955 | 1.5247 | 56.26 | −5.620 |
| 10 | 1.561 | 0.802 | | | −4.276 |
| 11 | ∞ | 0.300 | 1.5168 | 64.20 | |
| 12 | ∞ | 0.674 | | | |

| Surface Number | A4 | A6 | A8 | A10 | A12 | A14 | A16 |
|---|---|---|---|---|---|---|---|
| 1 (S) | −6.789E−3 | 2.618F.−4 | −1.386E−2 | 3.682E−3 | −9.711E−3 | 4.535E−3 | −2.955E−3 |
| 2 | 1.842E−2 | −2.358E−2 | −1.510E−2 | −1.166E−2 | 3.030E−3 | 0 | 0 |
| 3 | 1.465E−1 | −1.117E−1 | 5.082E−2 | −1.681E−2 | −1.391E−2 | 1.334E−2 | 0 |
| 4 | 9.611E−2 | −4.021E−2 | 1.153E−2 | 1.421E−2 | −1.461E−2 | 5.550E−3 | 0 |
| 5 | −4.518E−2 | −5.504E−3 | −2.914E−3 | 2.385E−3 | 0 | 0 | 0 |
| 6 | −4.104E−2 | −3.503E−3 | −5.896E−5 | 6.932E−4 | 0 | 0 | 0 |
| 7 | 5.684E−2 | −4.751E−2 | 2.584E−2 | −7.290E−3 | 9.508E−4 | 0 | 0 |
| 8 | 3.092E−2 | −6.249E−3 | −1.018E−3 | 1.379E−3 | −1.373E−4 | 0 | 0 |
| 9 | −6.971E−2 | 1.550E−2 | −1.986E−3 | 4.363E−5 | 2.079E−5 | −1.571E−6 | −1.765E−8 |
| 10 | −4.447E−2 | 1.070E−2 | −2.036E−3 | 2.489E−4 | −1.996E−5 | 1.000E−6 | −2.448E−8 |

f = 4.986 F = 2.8

Table 7 below relates to the first to sixth embodiments and shows values for conditional expressions (1) to (17) below.

Conditional expression (1) concerns the Abbe number of a material used for the first lens L1. Conditional expression (2) concerns the Abbe number of a material used for the second lens L2.

$$45<\nu 1<90 \qquad \text{Conditional expression (1)}$$

$$22<\nu 2<35 \qquad \text{Conditional expression (2)}$$

where ν1 is the Abbe number for d-line of the first lens, and ν2 is the Abbe number for d-line of the second lens.

Conditional expression (3) defines the range of the focal length of the first lens L1 with respect to the focal length of the entire image pickup lens. Conditional expression (4) defines the range of the focal length of the second lens L2 with respect to the focal length of the entire image pickup lens.

$$0.5<f1/f<1.00 \qquad \text{Conditional expression (3)}$$

$$-1.50<f2/f<-0.65 \qquad \text{Conditional expression (4)}$$

where f is the composite focal length of lenses included in the entire image pickup lens, f1 is the focal length of the first lens, and f2 is the focal length of the second lens.

Conditional expression (5) defines the range of the focal length of the fourth lens L4 with respect to the focal length of the entire image pickup lens. Conditional expression (6) defines the range of the focal length of the fifth lens L5 with respect to the focal length of the entire image pickup lens.

$$0.9<f4/f<1.50 \qquad \text{Conditional expression (5)}$$

$$-1.70<f5/f<-0.85 \qquad \text{Conditional expression (6)}$$

where f is the composite focal length of lenses included in the entire image pickup lens, f4 is the focal length of the fourth lens, and f5 is the focal length of the fifth lens.

Conditional expression (7) defines the ratio between the focal length of the first lens L1 and the focal length of the third lens L3.

$$-0.15<f1/f3<0.37 \qquad \text{Conditional expression (7)}$$

where f1 is the focal length of the first lens, and f3 is the focal length of the third lens.

Conditional expression (8) defines the composite focal length of the second lens L2, the third lens L3, and the fourth lens L4.

$$0.0<f2\cdot 3\cdot 4 \qquad \text{Conditional expression (8)}$$

Conditional expression (9) defines the power relationship, that is, the focal length relationship, between the first lens L1, the second lens L2, and the third lens L3. Conditional expression (10) defines the power relationship, that is, the focal length relationship, between the first lens L1, the third lens L3, and the fourth lens L4. Conditional expression (11) defines the power relationship, that is, the focal length relationship, between the first lens L1, the third lens L3, and the fifth lens L5.

$$f1<|f2|<|f3| \qquad \text{Conditional expression (9)}$$

$$f1<f4<|f3| \qquad \text{Conditional expression (10)}$$

$$f1<|f5|<|f3| \qquad \text{Conditional expression (11)}$$

Conditional expression (12) defines the lens shape of the first lens L1.

$$-0.40<r1/r2<0.10 \qquad \text{Conditional expression (12)}$$

where r1 is the curvature radius of the object-side surface of the first lens, and r2 is the curvature radius of the image-side surface of the first lens.

Conditional expression (13) defines the lens shape of the fourth lens L4.

$$1.4<r7/r8<3.0 \qquad \text{Conditional expression (13)}$$

where r7 is the curvature radius of the object-side surface of the fourth lens, and r8 is the curvature radius of the image-side surface of the fourth lens.

Conditional expression (14) defines the optical length with respect to the focal length.

$$1.05<L/f<1.30 \quad \text{Conditional expression (14)}$$

where L is the distance between the front surface of the first lens and the image surface, and f is the composite focal length of lenses included in the entire image pickup lens.

Conditional expression (17) defines the lens shape of the fourth lens L4 and relates to a case where conditions more stringent than those defined by conditional expression (13) are satisfied.

$$1.45<r7/r8<2.0 \quad \text{Conditional expression (17)}$$

where r7 is the curvature radius of the object-side surface of the fourth lens, and r8 is the curvature radius of the image-side surface of the fourth lens.

TABLE 7

| | First Embodiment | Second Embodiment | Third Embodiment | Fourth Embodiment | Fifth Embodiment | Sixth Embodiment |
|---|---|---|---|---|---|---|
| Conditional Expression (1) | 56.26 | 81.60 | 56.00 | 56.00 | 56.00 | 56.00 |
| Conditional Expression (2) | 25.58 | 25.58 | 30.00 | 30.00 | 25.58 | 25.58 |
| Conditional Expression (3) | 0.909 | 0.698 | 0.680 | 0.645 | 0.582 | 0.723 |
| Conditional Expression (4) | −1.205 | −0.966 | −0.979 | −0.778 | −1.089 | −0.997 |
| Conditional Expression (5) | 1.300 | 1.050 | 1.141 | 1.163 | 0.978 | 1.115 |
| Conditional Expression (6) | −1.671 | −1.144 | −1.150 | −1.262 | −0.957 | −1.340 |
| Conditional Expression (7) | 0.346 | 0.185 | 0.162 | 0.226 | −0.131 | 0.186 |
| Conditional Expression (8) | 10.266 | 10.597 | 13.323 | 15.698 | 18.816 | 10.806 |
| Conditional Expression (9) | | | | | | |
| f 1 | 4.379 | 3.747 | 3.584 | 3.344 | 3.319 | 3.606 |
| \|f 2\| | 5.800 | 5.191 | 5.160 | 4.037 | 6.205 | 4.973 |
| \|f 3\| | 12.647 | 20.214 | 22.174 | 14.764 | 25.268 | 19.382 |
| Conditional Expression (10) | | | | | | |
| f 1 | 4.379 | 3.747 | 3.584 | 3.344 | 3.319 | 3.606 |
| f 4 | 6.258 | 5.638 | 6.011 | 6.033 | 5.577 | 5.558 |
| \|f 3\| | 12.647 | 20.214 | 22.174 | 14.764 | 25.268 | 19.382 |
| Conditional Expression (11) | | | | | | |
| f 1 | 4.379 | 3.747 | 3.584 | 3.344 | 3.319 | 3.606 |
| \|f 5\| | 8.045 | 6.144 | 6.059 | 6.546 | 5.457 | 6.680 |
| \|f 3\| | 12.647 | 20.214 | 22.174 | 14.764 | 25.268 | 19.382 |
| Conditional Expression (12) | 0.000 | −0.103 | −0.082 | −0.184 | −0.137 | −0.098 |
| Conditional Expression (13) | 1.545 | 1.638 | 1.609 | 1.536 | 1.842 | 1.625 |
| Conditional Expression (14) | 1.292 | 1.220 | 1.215 | 1.238 | 1.147 | 1.279 |
| Conditional Expression (15) | 0.357 | 0.355 | 0.357 | 0.385 | 0.355 | 0.355 |

Conditional expression (15) defines the F-number (Fno), which is an indication of lens brightness.

$$0.30<CA1/f<0.50 \quad \text{Conditional expression (15)}$$

where CA1 is the diameter of the aperture stop, and f is the composite focal length of lenses included in the entire image pickup lens.

Conditional expression (16) defines the range of the focal length of the second lens L2 with respect to the focal length of the entire image pickup lens, and relates to a case where conditions more stringent than those defined by conditional expression (4) are satisfied.

$$-1.30<f2/f<-0.75 \quad \text{Conditional expression (16)}$$

where f is the composite focal length of lenses included in the entire image pickup lens, and f2 is the focal length of the second lens.

As shown in Table 7, the first to sixth embodiments of the present invention satisfy all of conditional expressions (1) to (17). Conditional expressions (1) and (2) define the Abbe number of the first lens L1 or the second lens L2. If the lower limit indicated by conditional expression (1) or (2) is exceeded, the variance value difference from the second lens L2 is decreased so that chromatic aberration correction is insufficient. If, on the contrary, the upper limit is exceeded, the balance between axial chromatic aberration and chromatic aberration of magnification is impaired so that performance deterioration occurs at the periphery of the image area. However, when conditional expressions (1) and (2) are satisfied, a proper balance is maintained between axial chromatic aberration and chromatic aberration of magnification. This makes it possible to prevent performance deterioration at the periphery of the image area and provide excellent chromatic aberration correction.

Conditional expressions (3) and (4) define the range of the focal length of the first lens L1 or the second lens L2 with respect to the focal length of the entire image pickup lens. If the lower limit indicated by conditional expression (3) is exceeded, the focal length of the first lens L1 is too small. This makes it difficult to correct spherical aberration and coma aberration. If, on the contrary, the upper limit is exceeded, the optical length is too great so that the thickness of the image pickup lens cannot be sufficiently reduced. If the lower limit indicated by conditional expression (4) is exceeded, the power of the second lens L2 is insufficient so that chromatic aberration cannot be adequately corrected. If, on the contrary, the upper limit is exceeded, the focal length of the second lens L2 is too small. This makes it difficult to correct spherical aberration and coma aberration, and decreases manufacturing error sensitivity. However, when conditional expressions (3) and (4) are satisfied, it is possible to properly correct spherical aberration and coma aberration. Further, the power of the second lens L2 becomes sufficient, making it possible to properly correct chromatic aberration, spherical aberration, and coma aberration.

Conditional expression (5) defines the range of the focal length of the fourth lens L4 with respect to the focal length of the entire image pickup lens. If the lower limit indicated by conditional expression (5) is exceeded, the focal length of the fourth lens L4 is too small. This makes it difficult to correct astigmatism and coma aberration, and decreases the manufacturing error sensitivity. If, on the contrary, the upper limit is exceeded, chromatic aberration of magnification and astigmatism are not adequately corrected so that expected performance is not obtained. However, when conditional expression (5) is satisfied, it is easy to correct astigmatism, coma aberration, and chromatic aberration of magnification. This makes it possible to obtain expected performance.

Conditional expression (6) defines the range of the focal length of the fifth lens L5 with respect to the focal length of the entire image pickup lens. If the lower limit indicated by conditional expression (6) is exceeded, the power of the fifth lens L5 is insufficient. This makes it difficult to decrease the optical length. If, on the contrary, the upper limit is exceeded, it is difficult to decrease the CRA, thereby decreasing the manufacturing error sensitivity at low image height. However, when conditional expression (6) is satisfied, the fifth lens L5 has a sufficient power, making it possible to reduce the optical length. This makes it easy to decrease the CRA so that the manufacturing error sensitivity at low image height increases.

Conditional expression (7) defines the ratio between the focal length of the first lens L1 and the focal length of the third lens L3. If the lower limit indicated by conditional expression (7) is exceeded, the focal length of the third lens L3 is negative and too small. This makes it difficult to provide aberration correction. If, on the contrary, the upper limit is exceeded, the focal length of the third lens L3 is positive and too small. This impairs the balance between astigmatism and coma aberration and decreases the manufacturing error sensitivity. However, when conditional expression (7) is satisfied, it is easy to provide aberration correction. Further, it is possible not only to prevent the focal length of the third lens L3 from being positive and too small, but also to maintain an excellent balance between astigmatism and coma aberration.

Conditional expression (8) defines the composite focal length of the second lens L2, the third lens L3, and the fourth lens L4. If the lower limit indicated by conditional expression (8) is exceeded, the negative power of the second lens L2 is too strong so that the manufacturing error sensitivity is excessively low, or the positive power of the fourth lens L4 is too weak so that it is difficult to correct astigmatism and distortion. However, when conditional expression (8) is satisfied, it is easy to correct astigmatism and distortion.

Conditional expression (9) defines the power relationship, that is, the focal length relationship, between the first lens L1, the second lens L2, and the third lens L3. If the lower limit indicated by conditional expression (9) is exceeded, the negative power of the second lens L2 is too strong. This increases the optical length and decreases the manufacturing error sensitivity. If, on the contrary, the upper limit is exceeded, the power of the third lens is too strong so that it is difficult to obtain adequate off-axis performance. However, when conditional expression (9) is satisfied, it is possible to decrease the optical length and easily obtain adequate off-axis performance.

Conditional expression (10) defines the power relationship, that is, the focal length relationship, between the first lens L1, the third lens L3, and the fourth lens L4. If the lower limit indicated by conditional expression (10) is exceeded, the power of the fourth lens L4 is too strong. This increases the optical length and makes it difficult to correct astigmatism and distortion. If, on the contrary, the upper limit is exceeded, the power of the third lens L3 is too strong so that it is difficult to obtain adequate off-axis performance. However, when conditional expression (10) is satisfied, it is easy to correct astigmatism and distortion and obtain adequate off-axis performance.

Conditional expression (11) defines the power relationship, that is, the focal length relationship, between the first lens L1, the third lens L3, and the fifth lens L5. If the lower limit indicated by conditional expression (11) is exceeded, the negative power of the fifth lens L5 is too strong. This makes it difficult to correct coma aberration and astigmatism. If, on the contrary, the upper limit is exceeded, the power of the third lens L3 is too strong so that it is difficult to obtain adequate off-axis performance. However, when conditional expression (11) is satisfied, it is easy to correct coma aberration and astigmatism and obtain adequate off-axis performance.

Conditional expression (12) defines the lens shape of the first lens L1. If the lower limit indicated by conditional expression (12) is exceeded, the optical length cannot be readily reduced. In addition, the error sensitivity prevailing during the manufacture of the first lens L1 becomes low. If, on the contrary, the upper limit is exceeded, it is difficult to maintain a proper aberration balance so that expected performance is not obtained. However, when conditional expression (12) is satisfied, the optical length can be readily reduced. In addition, it is possible to maintain a proper aberration balance and obtain expected performance.

Conditional expression (13) defines the lens shape of the fourth lens L4. If the lower limit indicated by conditional expression (13) is exceeded, the power of the fourth lens L4 is too weak. Consequently, performance deterioration occurs because it is difficult to correct various aberrations. If, on the contrary, the upper limit is exceeded, the fourth lens L4 has an excessively strong power or has a small degree of meniscus curvature. In this instance, too, it is difficult to maintain a proper aberration balance so that expected performance is not obtained. However, when conditional expression (13) is satisfied, it is easy to correct various aberrations and maintain a proper aberration balance. As a result, expected performance is obtained.

Conditional expression (14) defines the optical length with respect to the focal length. If the lower limit indicated by conditional expression (14) is exceeded, it is difficult to correct various aberrations due to an excessively decreased optical length. In addition, the manufacturing error sensitivity becomes excessively low. If, on the contrary, the upper limit is exceeded, it is difficult to reduce the thickness of the image pickup lens due to an excessively increased optical length. However, when conditional expression (14) is satisfied, it is easy to correct various aberrations. In addition, the thickness of the image pickup lens can be readily reduced because the optical length is not excessively small.

Conditional expression (15) defines the F-number (Fno), which is an indication of lens brightness. If the lower limit indicated by conditional expression (15) is exceeded, the F-number is excessively great so that requested brightness is not achieved in most cases. If, on the contrary, the upper limit is exceeded, the F-number is excessively small or the distance between the aperture stop (F-number light flux restriction plate) and the front surface of the first lens is excessively great. In either of these cases, expected optical performance is not obtained. However, when conditional expression (15) is satisfied, the expected optical performance can be obtained with ease.

Further, the second lens L2, the third lens L3, the fourth lens L4, and the fifth lens L5 are so-called plastic lenses that have at least one aspherical surface and are made of a resin material. Cost reduction can be achieved when at least the second lens L2, the third lens L3, the fourth lens L4, and the fifth lens L5 are made of an inexpensive resin material exhibiting high production efficiency.

Furthermore, as the aperture stop S is positioned on the object side of the first lens L1 to decrease the CRA (Chief Ray Angle), it is easy to reduce the CRA (Chief Ray Angle) and obtain sufficient light intensity at the periphery of the image surface at which light intensity decreases.

Moreover, as the object side surface and image side surface of the fifth lens L5 have an aspherical shape that contains at least one inflection point between the center and the periphery of the lens, it is possible to obtain adequate off axis performance and CRA.

While the present invention has been described in terms of exemplary embodiments, it should be understood that the invention is not limited to those exemplary embodiments. Those skilled in the art will understand that various changes and modifications can be made within the scope and spirit of the invention.

| EXPLANATION OF REFERENCE NUMERALS AND SYMBOLS | |
|---|---|
| L1 | First lens |
| L2 | Second lens |
| L3 | Third lens |
| L4 | Fourth lens |
| L5 | Fifth lens |
| S | Aperture stop |

The invention claimed is:

[1. An image pickup lens for a solid-state image pickup element, comprising, in the order from an object side:

a first lens, which has a convex surface facing the object side on an optical axis and has a positive refractive power;

a second lens, which has a concave surface facing an image side on the optical axis and has a negative refractive power;

a third lens, which has a convex surface facing the object side on the optical axis and has a meniscus shape;

a fourth lens, which has a convex surface facing the image side on the optical axis, has a positive refractive power, and has a meniscus shape; and a fifth lens, which has a concave surface facing the image side on the optical axis, has a negative refractive power, and has a meniscus shape.]

[2. The image pickup lens according to claim 1, wherein the Abbe number of a material used for the first lens and the second lens satisfies conditional expressions (1) and (2) below:

$$45<\nu1<90 \quad (1)$$

$$22<\nu2<35 \quad (2)$$

where ν1 is the Abbe number for d-line of the first lens, and ν2 is the Abbe number for d-line of the second lens.]

[3. The image pickup lens according to claim 1, wherein the second lens, the third lens, the fourth lens, and the fifth lens are so-called plastic lenses that have at least one aspherical surface and are made of a resin material.]

[4. The image pickup lens according to claim 1, wherein an aperture stop is positioned on the object side of the first lens.]

[5. The image pickup lens according to claim 1, wherein the object-side surface and the image-side surface of the fifth lens have an aspherical shape that contains at least one inflection point between the center and the periphery of the lens.]

[6. The image pickup lens according to claim 1, wherein the first lens and the second lens satisfy conditional expressions (3) and (4) below:

$$0.5<f1/f<1.00 \quad (3)$$

$$-1.50<f2/f<-0.65 \quad (4)$$

where f is the composite focal length of lenses included in the entire image pickup lens, f1 is the focal length of the first lens, and f2 is the focal length of the second lens.]

[7. The image pickup lens according to claim 1, wherein the fourth lens and the fifth lens satisfy conditional expressions (5) and (6) below:

$$0.9<f4/f<1.50 \quad (5)$$

$$-1.70<f5/f<-0.85 \quad (6)$$

where f is the composite focal length of lenses included in the entire image pickup lens, f4 is the focal length of the fourth lens, and f5 is the focal length of the fifth lens.]

[8. The image pickup lens according to claim 1, wherein the first lens and the third lens satisfy conditional expression (7) below:

$$-0.15<f1/f3<0.37 \quad (7)$$

where f1 is the focal length of the first lens, and f3 is the focal length of the third lens.]

[9. The image pickup lens according to claim 1, wherein the second lens, the third lens, and the fourth lens satisfy conditional expression (8) below:

$$0.0<f2\cdot3\cdot4 \quad (8)$$

where f2·3·4 is the composite focal length of the second, third, and fourth lenses.]

[10. The image pickup lens according to claim 1, wherein the first lens, the second lens, the third lens, the fourth lens, and the fifth lens satisfy conditional expressions (9), (10), and (11) below:

$$f1<|f2|<|f3| \quad (9)$$

$$f1<f4<|f3| \quad (10)$$

$$f1<|f5|<|f3| \quad (11)$$

where f1 is the focal length of the first lens, f2 is the focal length of the second lens, f3 is the focal length of the third lens, f4 is the focal length of the fourth lens, and f5 is the focal length of the fifth lens.]

[11. The image pickup lens according to claim 10, wherein the curvature radius of the first lens satisfies conditional expression (12) below:

$$-0.40<r1/r2<0.10 \quad (12)$$

where r1 is the curvature radius of the object-side surface of the first lens, and r2 is the curvature radius of the image-side surface of the first lens.]

[12. The image pickup lens according claim 10, wherein the curvature radius of the fourth lens satisfies conditional expression (13) below:

$$1.4<r7/r8<3.0 \quad (13)$$

where r7 is the curvature radius of the object-side surface of the fourth lens, and r8 is the curvature radius of the image-side surface of the fourth lens.]

[13. The image pickup lens according to claim 10, wherein the optical length and focal length of an optical system thereof satisfy conditional expression (14) below:

$$1.05<L/f<1.30 \quad (14)$$

where L is the distance between the front surface of the first lens and an image surface, and f is the composite focal length of lenses included in the entire image pickup lens.]

[14. The image pickup lens according to claim 4, wherein the diameter of the aperture stop satisfies conditional expression (15) below:

$$0.30<CA1/f<0.50 \quad (15)$$

where CA1 is the diameter of the aperture stop, and f is the composite focal length of lenses included in the entire image pickup lens.]

[15. The image pickup lens according to claim 10, wherein the Abbe number of a material used for the first lens and the second lens satisfies conditional expressions (1) and (2) below:

$$45<\nu1<90 \quad (1)$$

$$22<\nu2<35 \quad (2)$$

where ν1 is the Abbe number for d-line of the first lens, and ν2 is the Abbe number for d-line of the second lens.]

[16. The image pickup lens according to claim 10, wherein the second lens, the third lens, the fourth lens, and the fifth lens are so-called plastic lenses that have at least one aspherical surface and are made of a resin material.]

[17. The image pickup lens according to claim 10, wherein an aperture stop is positioned on the object side of the first lens.]

[18. The image pickup lens according to claim 10, wherein the object-side surface and the image-side surface of the fifth lens have an aspherical shape that contains at least one inflection point between the center and the periphery of the lens.]

*19. An image pickup lens for a solid-state image pickup element, comprising, in order from an object side:*

*a first lens, which has a convex surface facing the object side on an optical axis and has a positive refractive power;*

*a second lens;*

*a third lens;*

*a fourth lens, which has a convex surface facing an image side on the optical axis; and*

*a fifth lens, which has a concave surface facing the image side on the optical axis and has a negative refractive power,*

*wherein the second lens, the third lens, the fourth lens, and the fifth lens are plastic lenses that have at least one aspherical surface and are made of a resin material,*

*each of the first lens, the second lens, the third lens, the fourth lens, and the fifth lens is positioned without being joined on surfaces facing each other, and*

*Abbe numbers of materials used for the first lens and the second lens satisfy conditional expressions (1) and (2) below:*

$$45<\nu1<90 \quad (1)$$

$$22<\nu2<35 \quad (2)$$

*where ν1 is an Abbe number for d-line of the first lens, and ν2 is an Abbe number for d-line of the second lens.*

*20. The image pickup lens according to claim 19, wherein the second lens has a concave surface facing the image side on the optical axis and has a negative refractive power.*

*21. The image pickup lens according to claim 19, wherein the third lens has a convex surface facing the object side on the optical axis and has a meniscus shape.*

*22. The image pickup lens according to claim 19, wherein the fourth lens has a meniscus shape and a positive refractive power.*

*23. The image pickup lens according to claim 19, wherein the fifth lens has a meniscus shape.*

*24. The image pickup lens according to claim 19, wherein an image-side surface of the fifth lens has an aspherical shape that contains at least one inflection point between a center and a periphery of the fifth lens.*

*25. The image pickup lens according to claim 19, wherein the first lens and the second lens satisfy conditional expressions (3) and (4) below:*

$$0.5<f1/f<1.00 \quad (3)$$

$$-1.50<f2/f<-0.65 \quad (4)$$

*where f is a composite focal length of lenses included in an entirety of the image pickup lens, f1 is a focal length of the first lens, and f2 is a focal length of the second lens.*

*26. The image pickup lens according to claim 19, wherein the fourth lens and the fifth lens satisfy conditional expressions (5) and (6) below:*

$$0.9<f4/f<1.50 \quad (5)$$

$$-1.70<f5/f<-0.85 \quad (6)$$

*where f is a composite focal length of lenses included in an entirety of the image pickup lens, f4 is a focal length of the fourth lens, and f5 is a focal length of the fifth lens.*

*27. The image pickup lens according to claim 19, wherein the first lens and the third lens satisfy a conditional expression (7) below:*

$$-0.15<f1/f3<0.37 \quad (7)$$

*where f1 is a focal length of the first lens, and f3 is a focal length of the third lens.*

*28. The image pickup lens according to claim 19, wherein an optical length and focal length of an optical system thereof satisfy a conditional expression (14) below:*

$$1.05<L/f<1.30 \quad (14)$$

*where L is a distance between a front surface of the first lens and an image surface, and f is a composite focal length of lenses included in an entirety of the image pickup lens.*

*29. An image pickup lens for a solid-state image pickup element, comprising, in order from an object side:*

*a first lens, which has a convex surface facing the object side on an optical axis and has a positive refractive power;*

*a second lens, which has a concave surface facing an image side on the optical axis and has a negative refractive power;*

*a third lens;*

*a fourth lens, which has a convex surface facing the image side on the optical axis; and*

*a fifth lens, which has a concave surface facing the image side on the optical axis and has a negative refractive power,*

*wherein the second lens, the third lens, the fourth lens, and the fifth lens are plastic lenses that have at least one aspherical surface and are made of a resin material, and*

*each of the first lens, the second lens, the third lens, the fourth lens, and the fifth lens is positioned without being joined on surfaces facing each other.*

*30. The image pickup lens according to claim 29, wherein the third lens has a convex surface facing the object side on the optical axis and has a meniscus shape.*

*31. The image pickup lens according to claim 29, wherein the fourth lens has a meniscus shape and a positive refractive power.*

*32. The image pickup lens according to claim 29, wherein the fifth lens has a meniscus shape.*

*33. The image pickup lens according to claim 29, wherein an image-side surface of the fifth lens has an aspherical shape that contains at least one inflection point between a center and a periphery of the fifth lens.*

*34. The image pickup lens according to claim 29, wherein the first lens and the second lens satisfy conditional expressions (3) and (4) below:*

$$0.5<f1/f<1.00 \quad (3)$$

$$-1.50<f2/f<-0.65 \quad (4)$$

*where f is a composite focal length of lenses included in an entirety of the image pickup lens, f1 is a focal length of the first lens, and f2 is a focal length of the second lens.*

*35. The image pickup lens according to claim 29, wherein the fourth lens and the fifth lens satisfy conditional expressions (5) and (6) below:*

$$0.9<f4/f<1.50 \quad (5)$$

$$-1.70<f5/f<-0.85 \quad (6)$$

*where f is a composite focal length of lenses included in an entirety of the image pickup lens, f4 is a focal length of the fourth lens, and f5 is a focal length of the fifth lens.*

*36. The image pickup lens according to claim 29, wherein the first lens and the third lens satisfy a conditional expression (7) below:*

$$-0.15<f1/f3<0.37 \quad (7)$$

*where f1 is a focal length of the first lens, and f3 is a focal length of the third lens.*

*37. The image pickup lens according to claim 29, wherein an optical length and focal length of an optical system thereof satisfy a conditional expression (14) below:*

$$1.05<L/f<1.30 \quad (14)$$

*where L is a distance between a front surface of the first lens and an image surface, and f is a composite focal length of lenses included in an entirety of the image pickup lens.*

* * * * *